United States Patent
Stubbs

(10) Patent No.: US 6,698,812 B1
(45) Date of Patent: Mar. 2, 2004

(54) METHOD FOR TRANSPORTING AN ANIMAL CONTAINER AND APPARATUS THEREFOR

(76) Inventor: R. Clay Stubbs, HC3 Box 38, Johnson City, TX (US) 78636

(\*) Notice: Subject to any disclaimer, the term of this patent is extended or adjusted under 35 U.S.C. 154(b) by 2 days.

(21) Appl. No.: 10/397,462

(22) Filed: Mar. 26, 2003

(51) Int. Cl.$^7$ .................................................. B60P 3/05
(52) U.S. Cl. ....................... 296/24.2; 119/843; 119/400
(58) Field of Search .............................. 296/24.2, 24.1; 119/752, 723, 400, 734, 512, 843, 453

(56) References Cited

U.S. PATENT DOCUMENTS

| | | | | |
|---|---|---|---|---|
| 2,825,301 A | * | 3/1958 | Quist | 296/24.2 |
| 3,053,224 A | * | 9/1962 | Pierce | 296/24.2 |
| 3,574,388 A | * | 4/1971 | Stone | 296/24.2 |
| 3,726,256 A | * | 4/1973 | Bernhardt et al. | 296/24.2 |
| 4,168,933 A | * | 9/1979 | Kane | 296/24.2 |
| 4,201,157 A | * | 5/1980 | Lambert | 119/752 |
| 4,214,555 A | * | 7/1980 | Sawby | 119/723 |
| 4,228,766 A | * | 10/1980 | Wedman | 119/723 |
| 4,303,258 A | * | 12/1981 | Davis | 119/400 |
| 4,339,147 A | * | 7/1982 | Kimzey | 296/24.2 |
| 4,355,594 A | * | 10/1982 | Wagner | 296/24.2 |
| 4,569,309 A | * | 2/1986 | Wilson et al. | 119/734 |
| 4,630,570 A | * | 12/1986 | Wilson et al. | 119/512 |
| 5,394,836 A | * | 3/1995 | Lastein | 119/843 |
| 5,513,595 A | * | 5/1996 | Chatterton | 296/24.2 |
| 5,660,143 A | * | 8/1997 | Waring-Brown | 119/400 |
| 5,890,453 A | * | 4/1999 | Waring-Brown | 119/400 |
| 5,988,721 A | * | 11/1999 | Stenholm | 296/24.3 |
| 6,067,940 A | * | 5/2000 | Holder | 119/843 |
| 6,070,555 A | * | 6/2000 | Stubbs | 119/453 |
| 6,439,825 B1 | * | 8/2002 | Bonsall | 119/400 |
| 6,537,016 B2 | * | 3/2003 | Bonsall | 119/843 |
| 6,609,477 B1 | * | 8/2003 | White | 119/843 |

\* cited by examiner

*Primary Examiner*—Koran Patel
(74) *Attorney, Agent, or Firm*—Ted Masters

(57) ABSTRACT

Apparatus and method for transporting an animal container with a towing vehicle is disclosed. The animal container is rotatable about an axis from (1) an upright position disposed on a support surface, to (2) a tilted transportable position. The apparatus includes a tongue having a pivot end pivotally connected to the animal container and an opposite towing end selectively connectable to the towing vehicle. A stop is connected to the animal container, wherein when the animal container is in the upright position and the towing end of the tongue is pulled by the towing vehicle in a direction away from the animal container, the stop engages the support surface thereby enabling the rotation of the animal container about the axis.

30 Claims, 9 Drawing Sheets

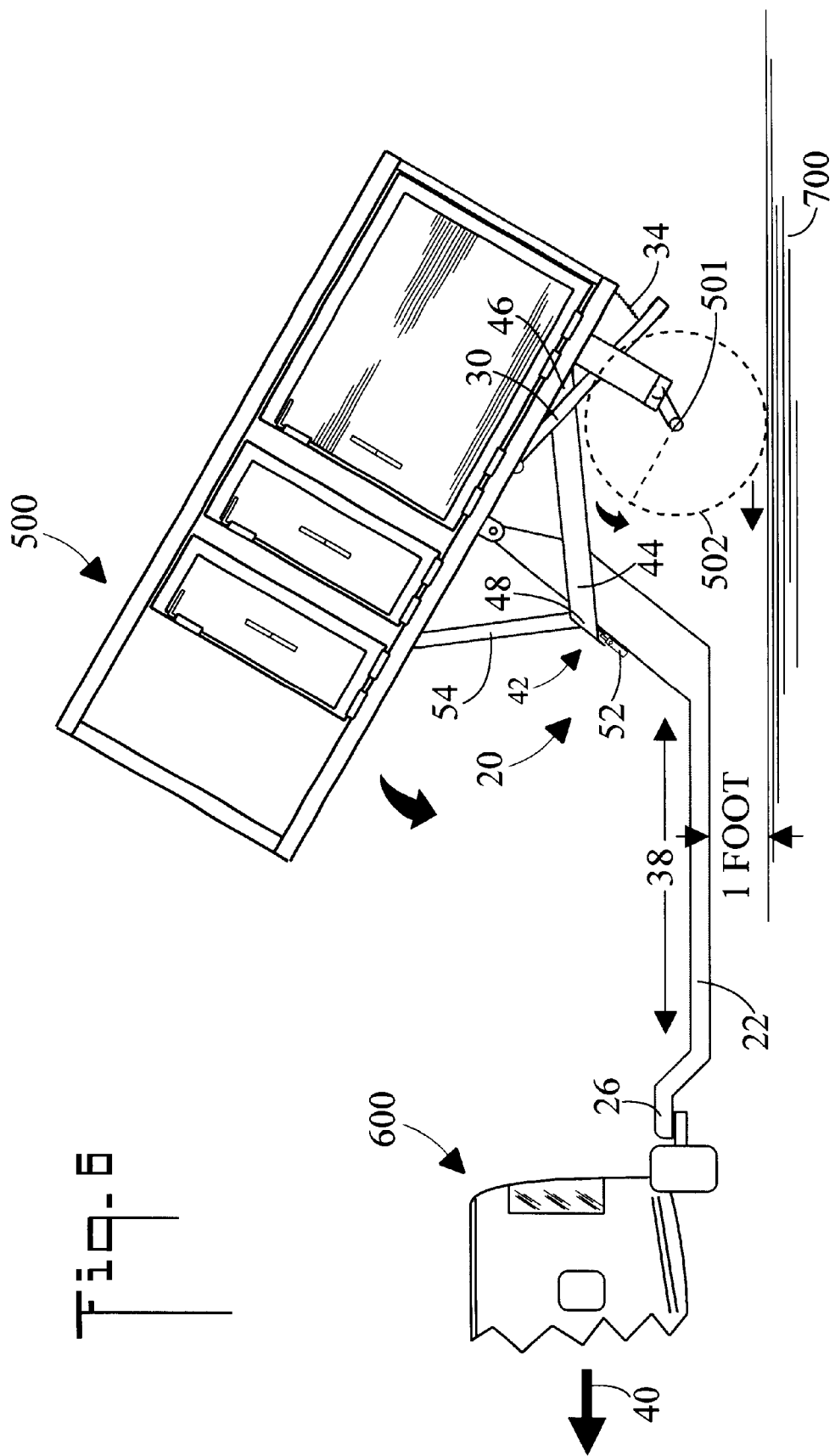

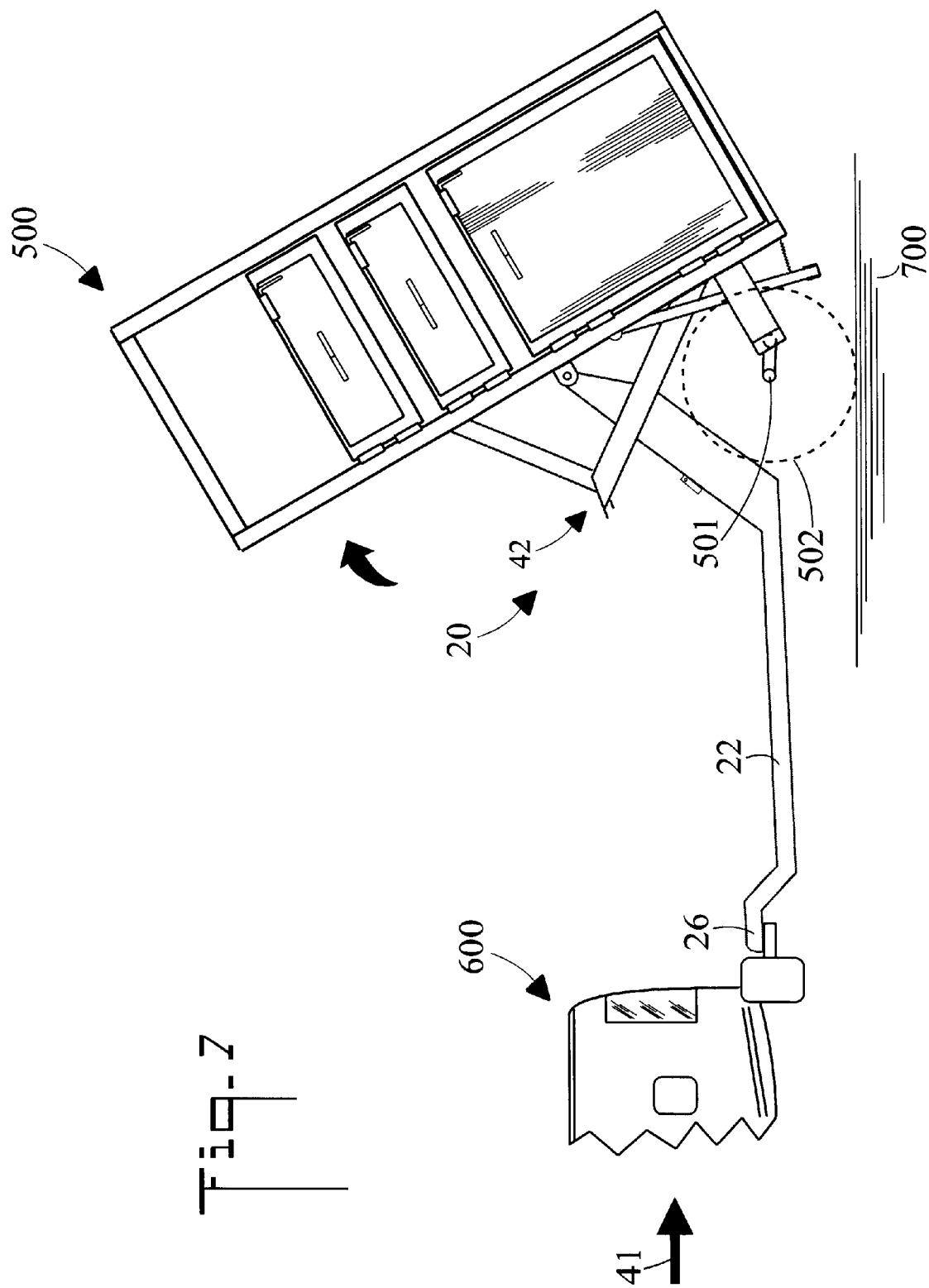

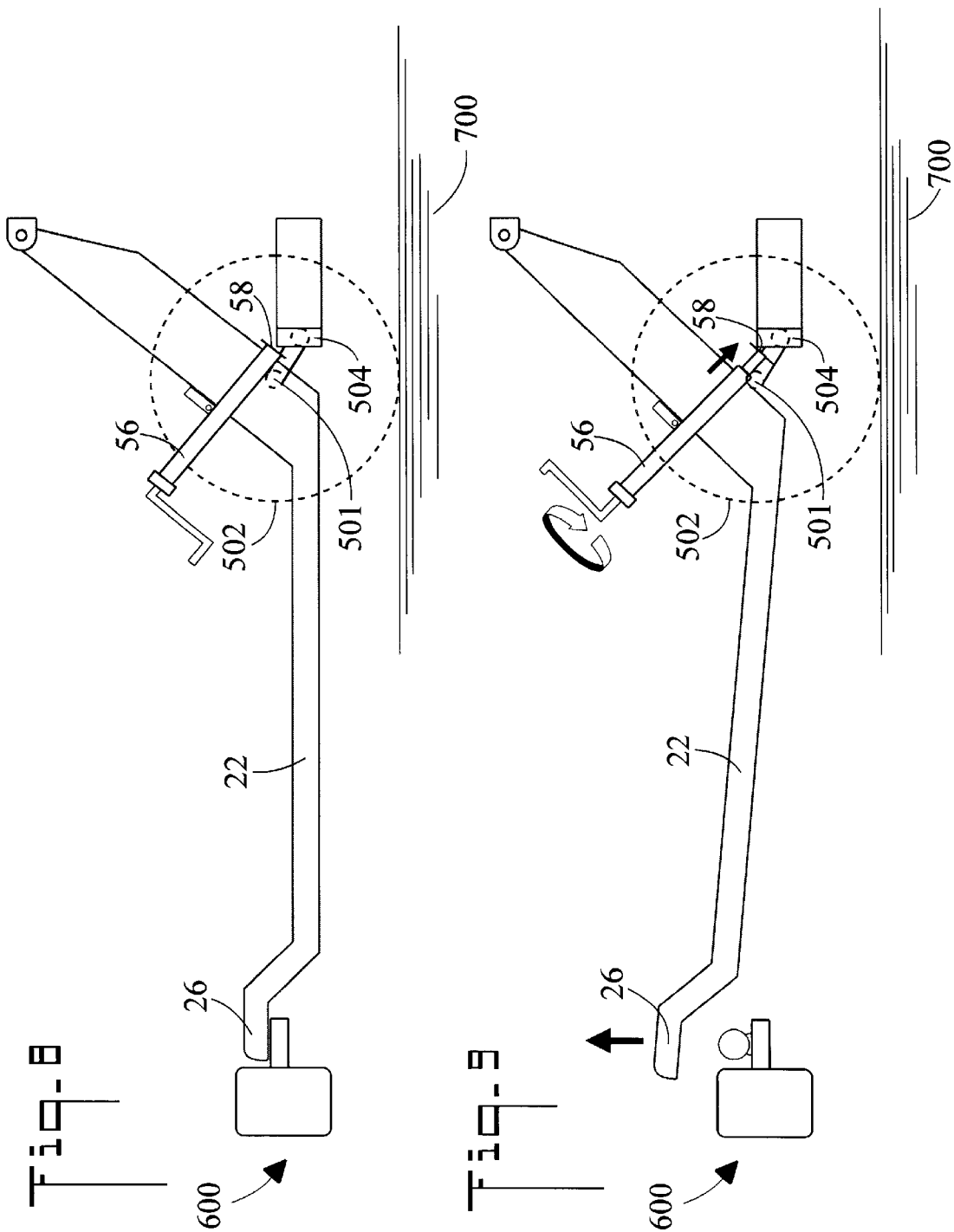

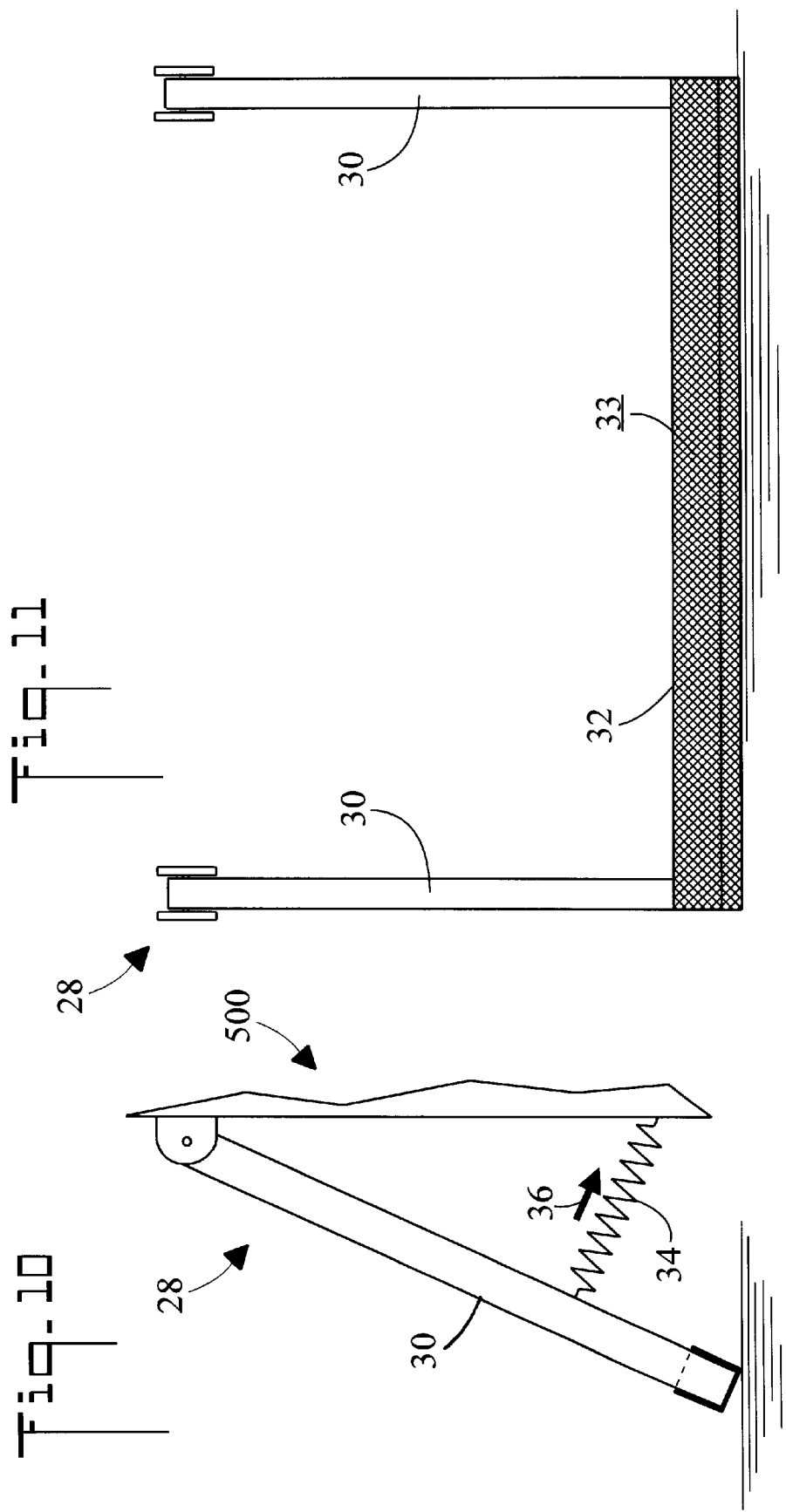

US 6,698,812 B1

METHOD FOR TRANSPORTING AN ANIMAL CONTAINER AND APPARATUS THEREFOR

TECHNICAL FIELD

The present invention pertains to devices such as stocks for containing or otherwise holding animals during the performance of veterinary procedures, and in particular to a method and apparatus for transporting such a container.

BACKGROUND OF THE INVENTION

Devices for containing animals for the administration of various veterinary procedures are well know in the art. Certain of these devices are additionally portable and may be readily moved from location to location by a towing vehicle. For example, U.S. Pat. No. 2,683,441 illustrates an animal holding chute for holding, calves or other farm animals in a recumbent position to facilitate the treatment or the performance of various veterinarian functions on the animal. The chute generally comprises a cage having a carriage composed of wheels disposed at the front and rear ends of the cage. Each wheel includes a rim and spokes and a pair of front vertical bars. Stationary and movable sides are disposed between the wheels, and contain the animal.

U.S. Pat. No. 3,574,388 defines a trailer for hauling horses, and the like, which is convertible for use as living quarters. The trailer includes a body comprising a bed, sidewalls, front wall, roof and rear doors. Wheel wells are provided inside the trailer at opposite sides thereof to accommodate extendible and retractable wheels.

U.S. Pat. No. 3,590,784 comprises a livestock tipping table and stall. The device is utilized to tip a horse or the like from a normally standing position to a generally horizontal position so as to enable a person to perform various operations upon the animal while it is laying upon its side. The tipping table extends vertically in order to permit strapping of the animal. After the animal has been securely strapped to the table, a fluid-actuated piston and rod is caused to retract within a cylinder. One end of the cylinder is pivotally mounted about a fixed pivot point while the opposing end of the piston rod is pivotally mounted at a pivot point on the table. As the piston rod is retracted, the table tilts about a fixed axis.

U.S. Pat. No. 4,201,157 discloses a portable animal handling unit. A wheeled frame having sidewalls and a bed form and animal walkway, and a self-contained hydraulic system to move the bed from an elevated travel position to a general ground level for passing animals through the unit. A front elevating assembly forms the frame into a chute for loading animals into vehicles with elevated floors.

U.S. Pat. No. 4,214,555 describes a portable cattle restraining apparatus, or cattle vise, useful in the procedure for trimming an animal's hoofs while maintaining it docile. The apparatus clamps the animal in a manner which imparts lifting force, while at the same time restraining movement. The frame which houses the clamp rotates so as to tilt the animal sideways, and the completely open bottom of the frame affords unrestricted access to the hoofs of the animal. The entire frame rests on the ground for maximum stability, but is converted into a trailer by rotation of a jackstand. U.S. Pat. No. 4,228,766 depicts a truck-mounted cattle control box which is mounted upon a small two wheeled trailer that can be towed by a tractor, truck or the like. The box is pivotally secured or mounted upon the axle and a hand operated fluid operator extends between the front of the trailer and one side of the box so that the box can be placed in a vertical position with the base on the ground whereupon an animal can be placed in or removed from the box, and the box can be rotated upon the axle through approximately 90° so that it is lying on its side with the animal held firmly in the box for treatment.

U.S. Pat. No. 4,228,766 pertains to a cattle control box which is mounted upon a small two wheeled trailer that can be towed by a tractor, truck or the like. The box is pivotally secured or mounted upon the axle and a hand operated fluid operator extends between the front of the trailer and one side of the box so that the box can be placed in a vertical position with the base on the ground whereupon an animal can be placed in or removed from the box, and the box can then be rotated upon the axle through approximately 90 degree. so that it is lying on its side with the animal held firmly in the box for treatment. The upper side of the box, when in the last mentioned position, includes an upper and lower gate for access to the animal. A head squeeze gate is provided at one end to hold the animal and also to release it after treatment and belts or the like are provided within the box to raise and hold the animal within the box.

U.S. Pat. No. 5,669,332 shows an portable chute for immobilizing an animal. The device has a front gate, a rear gate, and a stanchion for immobilizing the animal, all of which are operable by a single operator for a single location at the rear of the chute. The chute is pivotally mounted onto the bed of a vehicle and is rotatable by a fluid-operated cylinder between a horizontal or hoof-trimming position on the bed of the vehicle and an upright, vertical position.

U.S. Pat. No. 6,070,555 is directed to a portable apparatus (20) for containing an animal. The apparatus includes a stock (22) for receiving the animal, a tongue (24) pivotally connected to the stock (22), and a variable length controller (26) connected between the stock (22) and the tongue (26). The opposite towing end (30) of tongue (24) is connected to a towing vehicle (500). When the variable length controller (26) is placed in an extended position, stock (22) pivots about first (38) and second (42) wheels to a substantially vertical position suitable for receiving an animal. When variable length controller (26) is placed in a retracted position, stock (22) pivots to a substantially horizontal position above tongue (24), and may be conveniently towed between locations.

SUMMARY OF THE INVENTION

The present invention is directed to a method and apparatus for transporting an animal container which is used for containing or holding animals for the purpose of performing various veterinary procedures. The present invention permits the animal container to be rotated from an upright working position to a tilted transportable position in which the animal container may be pulled on a road by a towing vehicle. The method and apparatus of the present invention do not require the use of powered devices to rotate the animal container. Rather, all that is needed is movement provided by the towing vehicle.

In accordance with a preferred embodiment of the invention, a method for transporting an animal container, includes:

(a) providing a towing vehicle;
(b) providing a support surface such as a dirt or paved road;
(c) providing an animal container which is rotatable about an axis from (1) an upright position disposed on the support surface, to (2) a tilted transportable position;

(d) providing apparatus for transporting the animal container with the towing vehicle, the apparatus including:
  a tongue having a pivot end pivotally connected to the animal container and an opposite towing end selectively connectable to the towing vehicle;
  a stop which is pivotally connected to the animal container;
(e) with the animal container in the upright position, connecting the towing end of the tongue to the towing vehicle;
(f) using the towing vehicle to pull the towing end of the tongue away from the animal container;
(g) observing that the stop engages the support surface thereby enabling the rotation of the animal container about the axis; and,
(h) continuing to pull the towing end of the tongue away from the animal container until the animal container is in the tilted transportable position.

In accordance with an aspect of the invention,
in step (d), the apparatus includes a locking mechanism for locking the animal container in the tilted transportable position;
the method further includes using the locking mechanism to lock the animal container in the tilted transportable position; and,
using the towing vehicle to transport the animal container to a new location.

In accordance with an aspect of the invention,
in step (g), observing that the stop prevents the animal container from sliding across the support surface when the tongue is pulled.

In accordance with an aspect of the invention,
in step (c), the animal container includes two wheels which define the axis about which the animal container rotates, the two wheels having brakes which selectively prevent the two wheels from rotating about the axis; and,
before step (f), activating the brakes so that the two wheels cannot rotate about the axis.

In accordance with an aspect of the invention,
in step (c), when in the upright position the animal container having a vertical midpoint; and,
in step (d), the tongue is connected to the animal container at a point below the vertical midpoint.

In accordance with an aspect of the invention,
in step (d), the apparatus including a biasing element for rotationally urging the stop toward the animal container.

In accordance with an aspect of the invention,
in step (d), the tongue has a straight portion;
after step (e), observing that the straight portion disposed in a substantially horizontal position; and,
after step (h), observing that the straight portion disposed in a substantially horizontal position.

In accordance with an aspect of the invention,
after step (e), observing that the straight portion is no more than one foot from the support surface; and,
after step (h), observing that the straight portion is no more than one foot from the support surface.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 6 is a side elevation view showing the animal container rotated to the tilted transportable position;

FIG. 7 is a side elevation view showing the animal container being rotated from the tilted transportable position to the upright position;

FIG. 8 is an enlarged side elevation view of the tongue and an attached jack;

FIG. 9 is an enlarged side elevation view of the tongue being lifted by the jack;

FIG. 10 is an enlarged side elevation view of a stop; and,

FIG. 11 is an enlarged front elevation view of the stop.

DETAILED DESCRIPTION OF THE INVENTION

Figure 1:
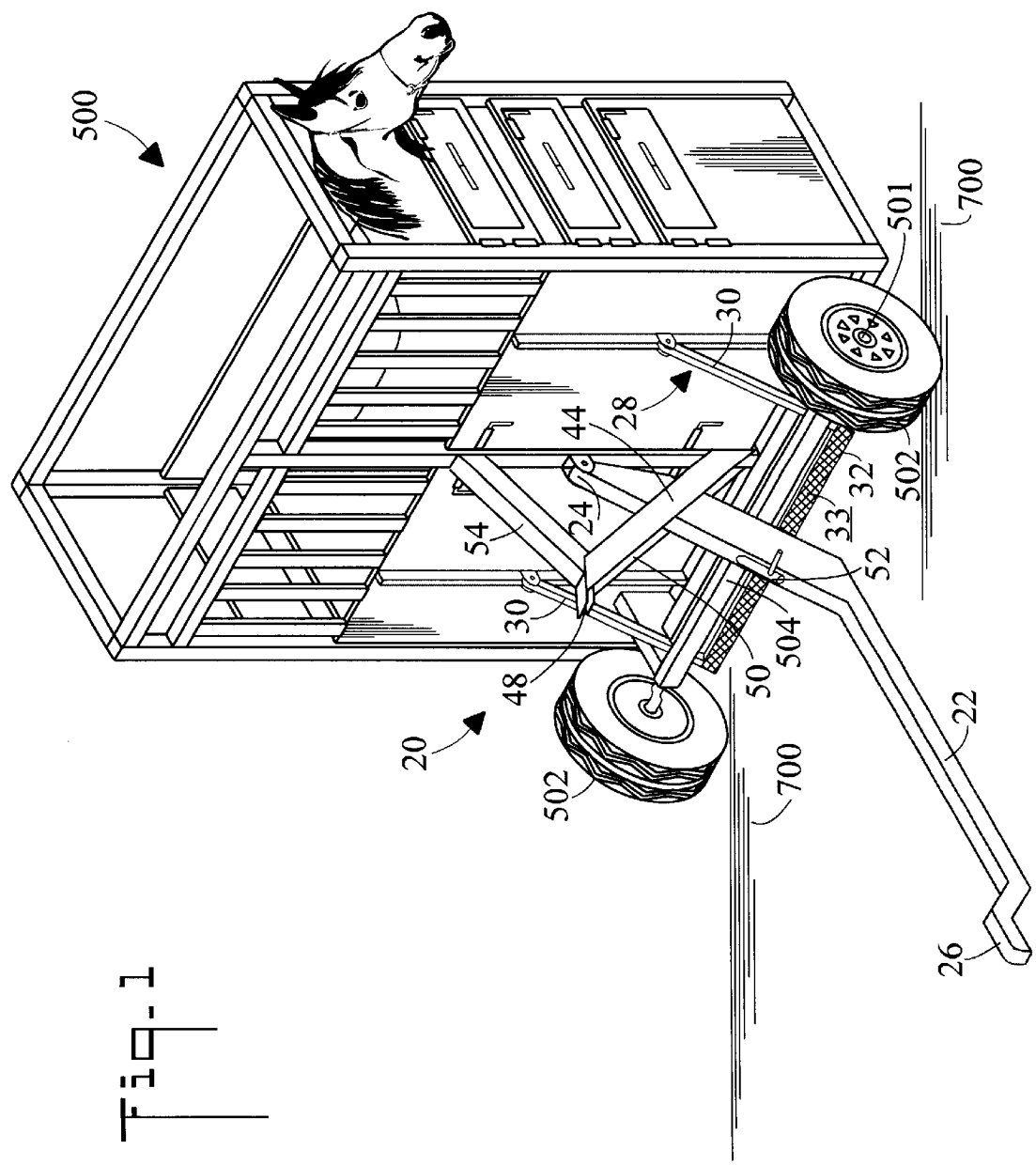
FIG. 1 is a perspective view of an animal container, and apparatus for transporting the animal container in accordance with the present invention.
Figure 2:
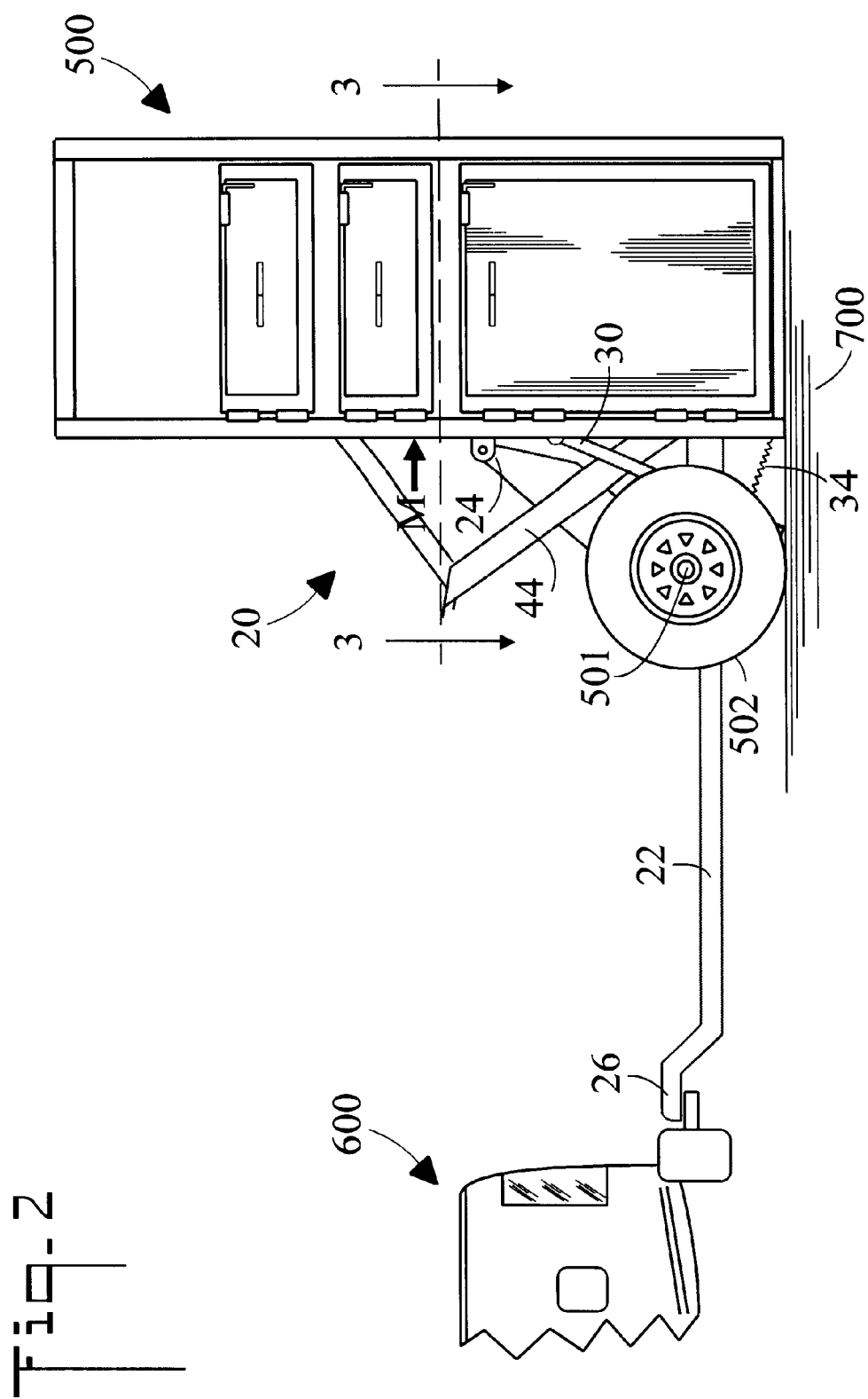
FIG. 2 is a side elevation view of the apparatus with the animal container in an upright position upon a support surface.
Figure 3:
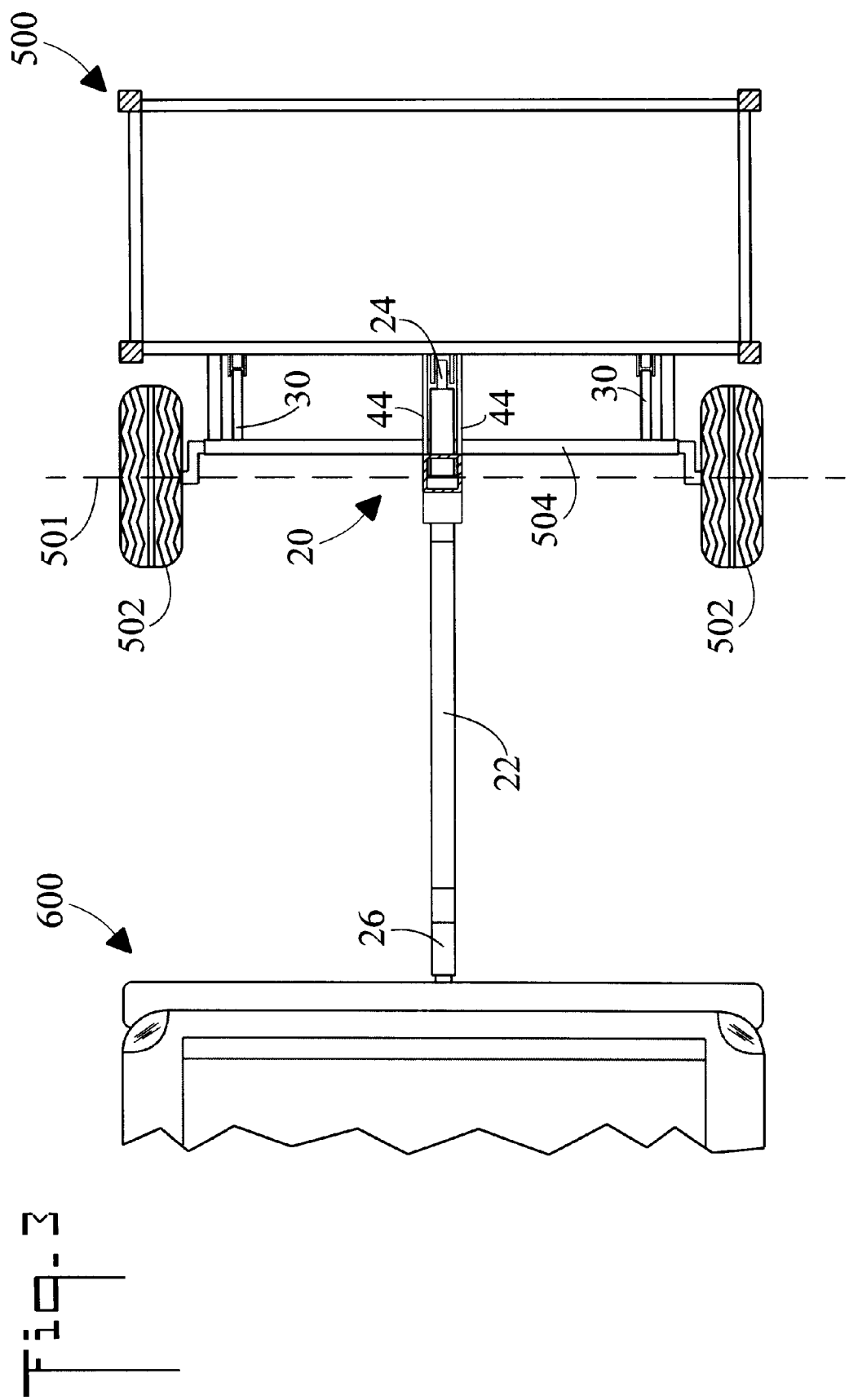
FIG. 3 is view along the line 3—3 of FIG. 2.

Referring initially to FIG. 1, there is illustrated a perspective view of an animal container 500, and apparatus for transporting the animal container 500 with a towing vehicle 600 in accordance with the present invention, the apparatus generally designated as 20. FIG. 2 is a side elevation view of apparatus 20 with animal container 500 in an upright position upon a support surface 700 (such as dirt or pavement), and FIG. 3. is view along the line 3—3 of FIG. 2.

Animal container 500 is rotatable about an axis 501 (refer to FIG. 2) from (1) an upright position (shown in FIGS. 1 and 2) disposed on support surface 700, to (2) a tilted transportable position (refer to FIG. 6). An animal is shown within animal container 500 in FIG. 1, for the purpose of performing various veterinary procedures. It may be appreciated that before animal container 500 is placed in the tilted transportable position (FIG. 6), the animal is removed from the container. Animal container 500 includes a box-shaped stock for containing the animal, two wheels 502, and axle 504. The center of wheels 502 define axis 501 of rotation of animal container 500. It is noted that axis 501 is off set from axle 504. This is because in the shown embodiment axle 504 is a rubber torsion axle which absorbs roadway shock and vibration.

Apparatus 20 includes a tongue 22 having a pivot end 24 which is pivotally connected to animal container 500, and an opposite towing end 26 which is selectively connectable to towing vehicle 600. When animal container 500 is in the upright position (FIGS. 1 and 2), the animal container 500 has a vertical midpoint M (refer to FIG. 2). In a preferred embodiment of the invention, tongue 22 is connected to animal container 500 at a point below vertical midpoint M. By locating the pivot point of tongue 22 low on animal container 500, tongue 22 will reside low to support surface 700, and can thus be conveniently stepped over by an individual walking in the area of animal container 500. However, by locating the pivot point low on animal container 500, a leverage problem is encountered in rotating animal container 500 from the upright position to the tilted transportable position as will be discussed below in the description of FIG. 5.

A stop 28 (also refer to FIGS. 10 and 11) is pivotally connected to animal container 500. Stop 28 includes two arms 30 which are connected by a horizontal member 32. In an embodiment of the invention, horizontal member 32 includes a friction enhancing surface 33, such as a rubber coating or raised protuberances, so that when horizontal member 32 of stop 28 engages support surface 700, stop 28 does not slide on support surface 28. A biasing element 34, such as a spring, rotationally urges stop 28 in direction 36 (refer to FIG. 10) toward animal container 500.

Figure 4:
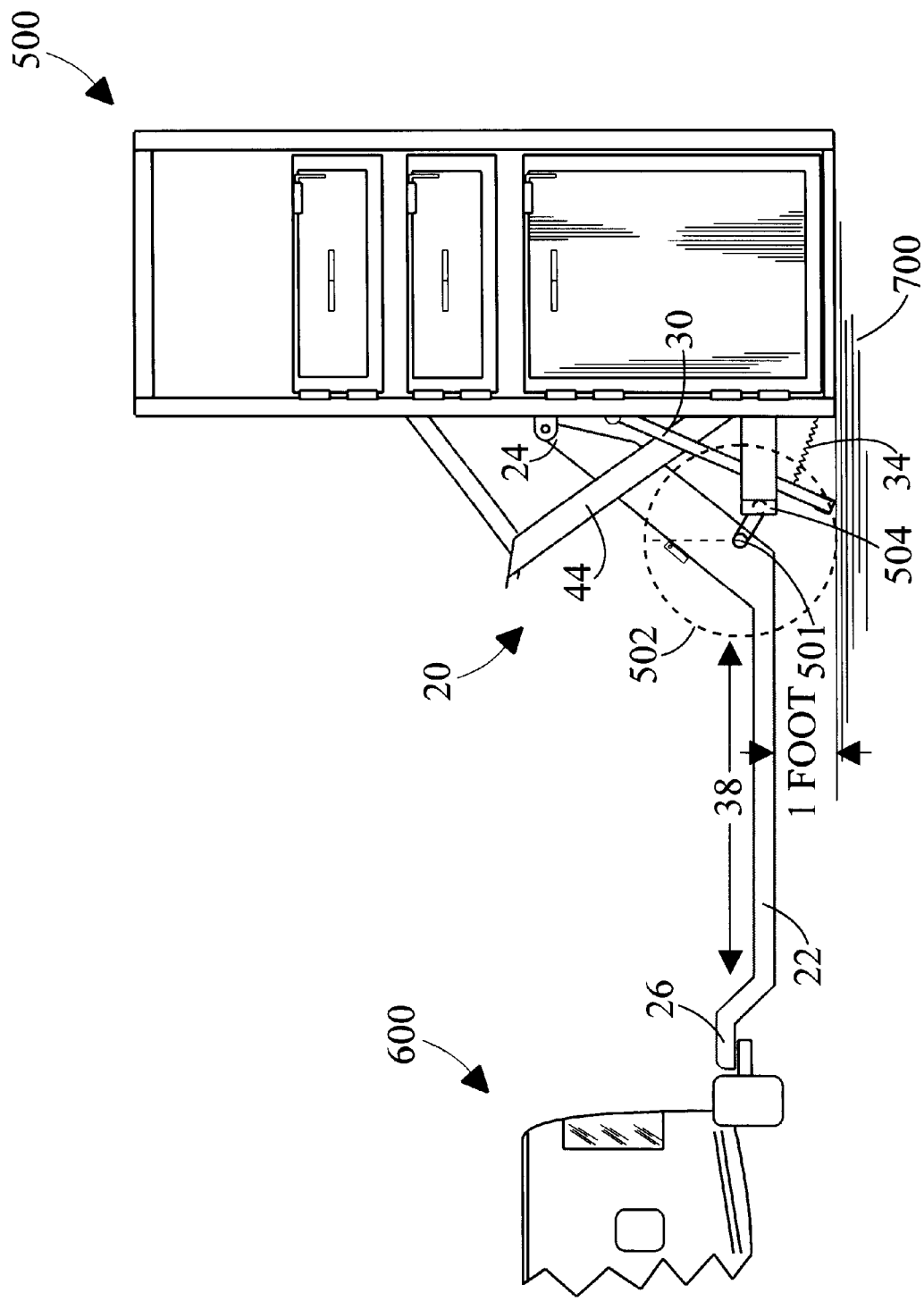
FIG. 4 is a side elevation view showing the animal container in the upright position.

FIG. 4 is a side elevation view showing animal container 500 in the upright position. In FIG. 4, as well as FIGS. 5–9, wheel 502 is depicted as a phantom line to better show the elements of the present invention. Tongue 22 has a straight portion 38. As shown in FIG. 4, when towing end 26 of tongue 22 is connected to towing vehicle 600, straight portion 38 is disposed in a substantially horizontal position (parallel to support surface 700) when animal container 500 is in both the upright position of FIG. 4 and the tilted transportable position (refer to FIG. 6). This feature is made possible by properly positioning the vertical location of the tongue 22 pivot point on animal container 500 with respect to the location of rotation axis 501. In an embodiment of the invention, straight portion 38 is located no more than one foot from support surface 700. This design ensures that straight portion 38 is low enough to be conveniently stepped over by individuals who may be walking in the area of animal container 500.

Figure 5:
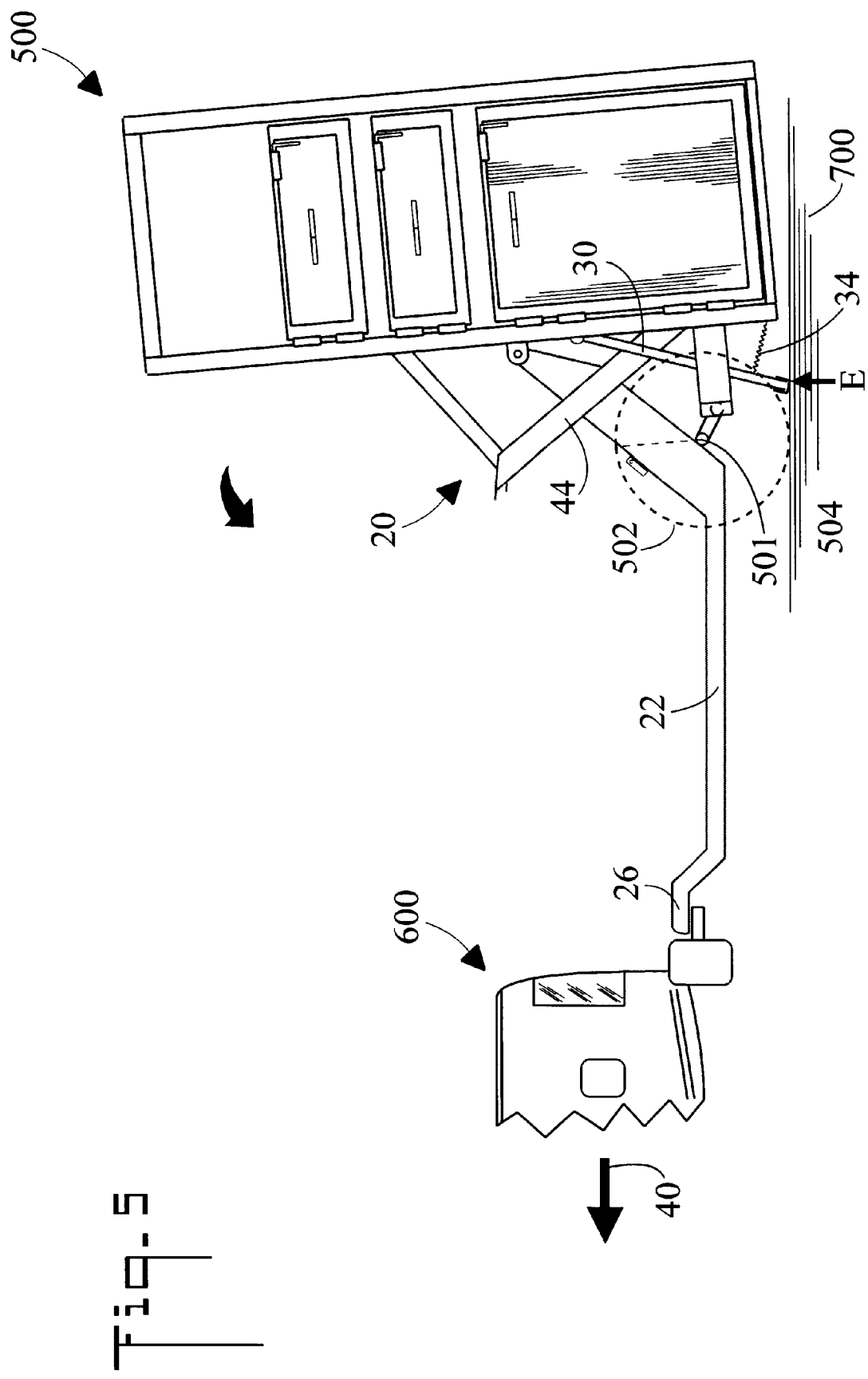
FIG. 5 is a side elevation view showing the animal container starting to rotate to a tilted transportable position.

FIG. 5 is a side elevation view showing animal container 500 starting to rotate to a tilted transportable position from the upright position of FIG. 4. Starting from the upright position, towing end 26 of tongue 22 is pulled by towing vehicle 600 in direction 40 away from animal container 500. Horizontal member 32 (refer to FIGS. 1 and 11) of stop 28 engages support surface 700 at point E and thereby enables the rotation of animal container 500 about axis 501. Were it not for stop 28, when tongue 22 is pulled by towing vehicle 600, animal container 500 would not rotate about axis 501 to the tilted transportable position, but would rather simply slide along support surface 700. This is because, due to the desire to easily step over tongue 22, the pivot connection of tongue 22 is located low on animal container 500 (below the vertical mid point M of animal container 500, refer to FIG. 2). The action of stop 28 compensates for the low positioning of the pivot connection of tongue 22, and enables animal container to roll over into the tilted transportable position. As pulling commences, stop 28 engages (digs into) support surface 700 at point E thereby preventing animal container 500 from sliding across support surface 700. As the pulling continues, for a while stop 28 bears some of the weight of animal container 500 and animal container 500 rotates about stop 28 at point E. Then as the pulling continues, the weight of animal container 500 is transferred to wheels 502, and wheels 502 commence to roll on support surface 700 thereby rotating animal container 500 around axis 501 and into the tilted transportable position shown in FIG. 6. Biasing element 34 urges stop 28 toward animal container 500, and thereby enhances the engaging action with support surface 700 at point E.

In an embodiment of the invention, the wheels 502 of animal container 500, which define the axis 501 about which animal container 500 rotates, have brakes which selectively prevent the two wheels 502 from rotating about axis 501. By activating the brakes, animal container 500 cannot rotate about axis 501, but rather rolls along support surface 700 in the direction of pull 40.

Referring now to FIG. 6, there is illustrated a side elevation view showing animal container 500 rotated to the tilted transportable position. In this position, animal container 500 may be transported from site to site using towing vehicle 600. Apparatus 20 further includes a locking mechanism 42 for locking animal container 500 in the tilted transportable position. Also referring to FIG. 1, in an embodiment of the invention, locking mechanism 42 includes a bifurcated member 44 which has a proximal end 46 connected to animal container 500, an opposite distal end 48, and an open central portion 50 which receives tongue 22. Bifurcated member 44 serves to keep animal container 500 from swaying with respect to tongue 22. A lock 52 disposed on tongue 22 selectively locks distal end 48 of bifurcated member 44 to tongue 22, thereby retaining animal container 500 in the tilted transportable position. For support, a brace 54 is connected between distal end 48 of bifurcated member 44 and animal container 500. Just as with the upright position of FIG. 4, it is noted that in the tilted transportable position straight portion 38 of tongue 22 is disposed in a substantially horizontal position, and is disposed no more than one foot from support surface 700. It is further noted that when in the tilted transportable position, biasing element 34 urges stop 28 toward animal container 500, so that stop 28 cannot bounce against axle 504 when animal container 500 is being transported (refer also to FIG. 10).

FIG. 7 is a side elevation view showing animal container 500 being rotated from the tilted transportable position to the upright position. After disengaging locking mechanism 42, towing vehicle 600 is moved back toward animal container 500 in direction 41, thereby causing animal container 500 to rotate to the upright position.

FIG. 8 is an enlarged side elevation view of tongue 22 and an attached jack 56. Jack 56 is connected to tongue 22 and has an extendable end 58.

FIG. 9 is an enlarged side elevation view of towing end 26 of tongue 22 being lifted by jack 56. When jack 56 is activated (when the handle is turned in the shown embodiment), end 58 extends and abuts axle 504 thereby lifting towing end 26 of tongue 22.

FIGS. 10 and 11 are an enlarged side elevation and enlarged front elevation views respectively of stop 28,which is pivotally connected to animal container 500. Stop 28 includes two arms 30 which are connected by a horizontal member 32. In an embodiment of the invention, horizontal member 32 includes a friction enhancing surface 33, such as a rubber coating or raised protuberances, so that when horizontal member 32 of stop 28 engages support surface 700, stop 28 does not slide on support surface 28. A biasing element 34, such as a spring, rotationally urges stop 28 in direction 36 toward animal container 500. The biasing feature both enhances the engagement of stop 28 with support surface 700, and moves stop out of the way of axle 504 when animal container 500 is in the tilted transportable position (refer to FIG. 6).

In terms of use, a method for transporting an animal container 500, includes:
  (a) providing a towing vehicle 600;
  (b) providing a support surface 700;
  (c) providing an animal container 500 which is rotatable about an axis 501 from (1) an upright position disposed on support surface 700, to (2) a tilted transportable position;
  (d) providing apparatus 20 for transporting animal container 500 with towing vehicle 600, apparatus 20 including:
    a tongue 22 having a pivot end 24 pivotally connected to animal container 500 and an opposite towing end 26 selectively connectable to towing vehicle 600;

a stop 28 connected to animal container 500;

(e) with animal container 500 in the upright position, connecting towing end 26 of tongue 22 to towing vehicle 600;

(f) using towing vehicle 600 to pull towing end 26 of tongue 22 away from animal container 500;

(g) observing that stop 28 engages support surface 700 thereby enabling the rotation of animal container 500 about axis 501; and, (h) continuing to pull towing end 26 of tongue 22 away from animal container 500 until animal container 500 is in the tilted transportable position.

The method further including:

in step (d), apparatus 20 including a locking mechanism 42 for locking animal container 500 in the tilted transportable position;

using locking mechanism 42 to lock animal container 500 in the tilted transportable position; and, using towing vehicle 600 to transport animal container 500 to a new location.

The method further including:

locking mechanism 42 including:
- a bifurcated member 44 having a proximal end 46 connected to animal container 500 and an opposite distal end 48, bifurcated member 44 having an open central portion 50 which receives tongue 22; and
- a lock 52 disposed on tongue 22 which selectively locks distal end 48 of bifurcated member 44 to tongue 22.

The method further including:

a brace 54 connected between distal end 48 of bifurcated member 44 and animal container 500.

The method further including:

in step (g), observing that stop 28 prevents animal container 500 from sliding across support surface 700 when tongue 22 is pulled.

The method further including:

in step (c), animal container 500 including two wheels 502 which define axis 501 about which animal container 500 rotates, two wheels 502 having brakes which selectively prevent two wheels 502 from rotating about axis 501; and, before step (f), activating the brakes so that two wheels 502 cannot rotate about axis 501.

The method of further including:

in step (d), stop 28 pivotally connected to animal container 28.

The method further including:

in step (d), apparatus 20 including a biasing element 34 for rotationally urging stop 28 toward animal container 500.

The method further including:

in step (d), stop 28 including two arms 30 connected by an elongated horizontal member 32.

The method further including:

in step (c), when in the upright position animal container 500 having a vertical midpoint M; and, in step (d), tongue 22 connected to animal container 500 at a point below vertical midpoint M.

The method further including:

horizontal member 32 including a friction enhancing surface 33, so that when stop 28 engages support surface 700, stop 28 does not slide on support surface 700.

The method further including:

in step (c), animal container 500 having an axle 504;

in step (d) apparatus 20 including a jack 56 connected to tongue 22, jack 56 having an extendable end 58;

disconnecting towing end 26 of tongue 22 from towing vehicle 600; and, activated jack 56 thereby causing extendable end 58 to extend and abut axle 504 thereby lifting towing end 26 of tongue 22.

The method further including:

in step (d), tongue 22 having a straight portion 38;

after step (e), observing that straight portion 38 is disposed in a substantially horizontal position; and, after step (h), observing that straight portion 38 disposed in a substantially horizontal position.

The method further including:

after step (e), observing that straight portion 38 is no more than one foot from support surface 700; and, after step (h), observing that straight portion 38 is no more than one foot from support surface 700.

The method further including:

in step (d), apparatus 20 including a locking mechanism 42 for locking animal container 500 in the tilted transportable position;

using locking mechanism 42 to lock animal container 500 in the tilted transportable position;

using towing vehicle 600 to transport animal container 500 to a new location;

when at the new location, using locking mechanism 42 to unlock animal container 500 from the tilted transportable position;

using towing vehicle 600 to push towing end 26 of tongue 22 toward animal container 500; and, observing that animal container 500 rotates from the tilted transportable position to the upright position.

The method further including:

in step (c), animal container 500 including two wheels 502 which define axis 501 about which animal container 500 rotates, two wheels 502 having brakes which selectively prevent two wheels 502 from rotating about axis 501; and, before the step of using towing vehicle 600 to push towing end 26 of tongue 22 toward animal container 500, activating the brakes so that two wheels 502 cannot rotate about axis 502.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A method for transporting an animal container, comprising:

(a) providing a towing vehicle;

(b) providing a support surface;

(c) providing an animal container rotatable about an axis from (1) an upright position disposed on said support surface, to (2) a tilted transportable position;

(d) providing apparatus for transporting said animal container with said towing vehicle, said apparatus including:

a tongue having a pivot end pivotally connected to said animal container and an opposite towing end selectively connectable to said towing vehicle;

a stop connected to said animal container;

(e) with said animal container in said upright position, connecting said towing end of said tongue to said towing vehicle;

(f) using said towing vehicle to pull said towing end of said tongue away from said animal container;

(g) observing that said stop engages said support surface thereby enabling the rotation of said animal container about said axis; and, (h) continuing to pull said towing end of said tongue away from said animal container until said animal container is in said tilted transportable position.

2. The method of claim 1, further including:

in step (d), said apparatus including a locking mechanism for locking said animal container in said tilted transportable position;

using said locking mechanism to lock said animal container in said tilted transportable position; and, using said towing vehicle to transport said animal container to a new location.

3. The method of claim 2, further including:

said locking mechanism including:
a bifurcated member having a proximal end connected to said animal container and an opposite distal end, said bifurcated member having an open central portion which receives said tongue; and,
a lock disposed on said tongue which selectively locks said distal end of said bifurcated member to said tongue.

4. The method of claim 3, further including:

a brace connected between said distal end of said bifurcated member and said animal container.

5. The method of claim 1, further including:

in step (g), observing that said stop prevents said animal container from sliding across said support surface when said tongue is pulled.

6. The method of claim 1, further including:

in step (c), said animal container including two wheels which define said axis about which said animal container rotates, said two wheels having brakes which selectively prevent said two wheels from rotating about said axis; and, before step (f), activating said brakes so that said two wheels cannot rotate about said axis.

7. The method of claim 1, further including:

in step (d), said stop pivotally connected to said animal container.

8. The method of claim 7, further including:

in step (d), said apparatus including a biasing element for rotationally urging said stop toward said animal container.

9. The method of claim 1, further including:

in step (d), said stop including two arms connected by a horizontal member.

10. The method of claim 9, further including:

said horizontal member including a friction enhancing surface, so that when said stop engages said support surface, said stop does not slide on said support surface.

11. The method of claim 1, further including:

in step (c), when in said upright position said animal container having a vertical midpoint; and, in step (d), said tongue connected to said animal container at a point below said vertical midpoint.

12. The method of claim 1, further including:

in step (c), said animal container having an axle;

in step (d) said apparatus including a jack connected to said tongue, said jack having an extendable end;

disconnecting said towing end of said tongue from said towing vehicle; and, activated said jack thereby causing said extendable end to extend and abut said axle thereby lifting said towing end of said tongue.

13. The method of claim 1, further including:

in step (d), said tongue having a straight portion;

after step (e), observing said straight portion disposed in a substantially horizontal position; and, after step (h), observing said straight portion disposed in a substantially horizontal position.

14. The method of claim 13, further including:

after step (e), observing that said straight portion is no more than one foot from said support surface; and, after step (h), observing that said straight portion is no more than one foot from said support surface.

15. The method of claim 1, further including:

in step (d), said apparatus including a locking mechanism for locking said animal container in said tilted transportable position;

using said locking mechanism to lock said animal container in said tilted transportable position;

using said towing vehicle to transport said animal container to a new location;

when at said new location, using said locking mechanism to unlock said animal container from said tilted transportable position;

using said towing vehicle to push said towing end of said tongue toward said animal container; and, observing that said animal container rotates from said tilted transportable position to said upright position.

16. The method of claim 15, further including:

in step (c), said animal container including two wheels which define said axis about which said animal container rotates, said two wheels having brakes which selectively prevent said two wheels from rotating about said axis; and, before said step of using said towing vehicle to push said towing end of said tongue toward said animal container, activating said brakes so that said two wheels cannot rotate about said axis.

17. Apparatus for transporting an animal container with a towing vehicle, the animal container rotatable about an axis from (1) an upright position disposed on a support surface, to (2) a tilted transportable position, said apparatus comprising:

a tongue having a pivot end pivotally connected to the animal container and an opposite towing end selectively connectable to the towing vehicle;

a stop connected to the animal container;

wherein when the animal container is in the upright position and said towing end of said tongue is pulled by the towing vehicle in a direction away from the animal container, said stop engages the support surface thereby enabling the rotation of the animal container about the axis.

18. Apparatus according to claim 17, further including:

said stop preventing the animal container from sliding across the support surface when said tongue is pulled.

19. Apparatus according to claim 17 further including:
a locking mechanism for locking the animal container in the tilted transportable position.

20. Apparatus according to claim 19, further including:
said locking mechanism including:
   a bifurcated member having a proximal end connected to the animal container and an opposite distal end, said bifurcated member having an open central portion which receives said tongue; and
   a lock disposed on said tongue which selectively locks said distal end of said bifurcated member to said tongue.

21. Apparatus according to claim 20, further including:
a brace connected between said distal end of said bifurcated member and the animal container.

22. Apparatus according to claim 17, further including:
said stop pivotally connected to the animal container.

23. Apparatus according to claim 22, further including:
a biasing element for rotationally urging said stop toward the animal container.

24. Apparatus according to claim 17, further including:
said stop including two arms connected by a horizontal member.

25. Apparatus according to claim 24, further including:
said horizontal member including a friction enhancing surface, so that when said stop engages the support surface, said stop does not slide on the support surface.

26. Apparatus according to claim 17, when in the upright position the animal container having a vertical midpoint, said apparatus further including:
said tongue connected to the animal container at a point below the vertical midpoint.

27. Apparatus according to claim 17, the animal container having an axle, said apparatus further including:
a jack connected to said tongue, said jack having an extendable end; and,
wherein said jack may be activated causing said extendable end to extend and abut the axle thereby lifting said towing end of said tongue.

28. Apparatus according to claim 17, further including:
said tongue having a straight portion; and,
when said towing end of said tongue is connected to the towing vehicle, said straight portion disposed in a substantially horizontal position when the animal container is in both the upright position and the tilted transportable position.

29. Apparatus according to claim 28, further including:
said straight portion being no more than one foot from the support surface.

30. Apparatus according to claim 17, when in the upright position the animal container having a vertical midpoint, said apparatus further including:
   said stop preventing said animal container from sliding across the support surface when said tongue is pulled;
   a locking mechanism for locking the animal container in the tilted transportable position;
   said stop pivotally connected to the animal container;
   said tongue connected to the animal container at a point below the vertical midpoint;
   a biasing element for rotationally urging said stop toward the animal container;
   said tongue having a straight portion; and,
   when said towing end of said tongue is connected to the towing vehicle, said straight portion disposed in a substantially horizontal position when the animal container is in both the upright position and the tilted transportable position.

* * * * *